United States Patent [19]

Paddison

[11] Patent Number: 5,588,660
[45] Date of Patent: Dec. 31, 1996

[54] STEERING AXLE

[75] Inventor: Richard L. Paddison, Ortonville, Mich.

[73] Assignee: General Motors Corporation, Detroit, Mich.

[21] Appl. No.: 535,428

[22] Filed: Sep. 28, 1995

[51] Int. Cl.$^6$ ........................................................ B62D 7/08
[52] U.S. Cl. ................................................ 280/95.1; 180/400
[58] Field of Search .............................. 280/95.1; 180/79

[56] References Cited

U.S. PATENT DOCUMENTS

| | | | |
|---|---|---|---|
| 3,981,513 | 9/1976 | Erskine | 280/95.1 |
| 4,161,327 | 7/1979 | Honecker | 280/95.1 |
| 4,408,775 | 10/1983 | Hildebrecht | 280/95.1 |
| 4,536,003 | 8/1985 | Maurer | 280/95.1 |
| 4,600,205 | 7/1986 | Stewart et al. | 280/95.1 |
| 4,660,845 | 4/1987 | Herr | 280/95.1 |
| 4,915,530 | 4/1990 | Tomlinson | 403/158 |

*Primary Examiner*—Kenneth R. Rice
*Attorney, Agent, or Firm*—Jeffrey A. Sedlar

[57] ABSTRACT

A steering axle includes a reversible axle beam assembleable with a pair of steering knuckle assemblies in one orientation providing a first range of maximum steering angles and in a second, reversed orientation providing a second range of maximum steering angles. The axle beam includes an elongated structure with two ends, each adapted to carry a steering knuckle assembly that is pivotably rotatable about a steering axis by a steering arm. Each end of the axle beam includes a pair of stops formed integrally therewith. The two stops within each pair are disposed across the longitudinal centerline of the axle from each other and at two distinct distances along the axle beam.

4 Claims, 2 Drawing Sheets

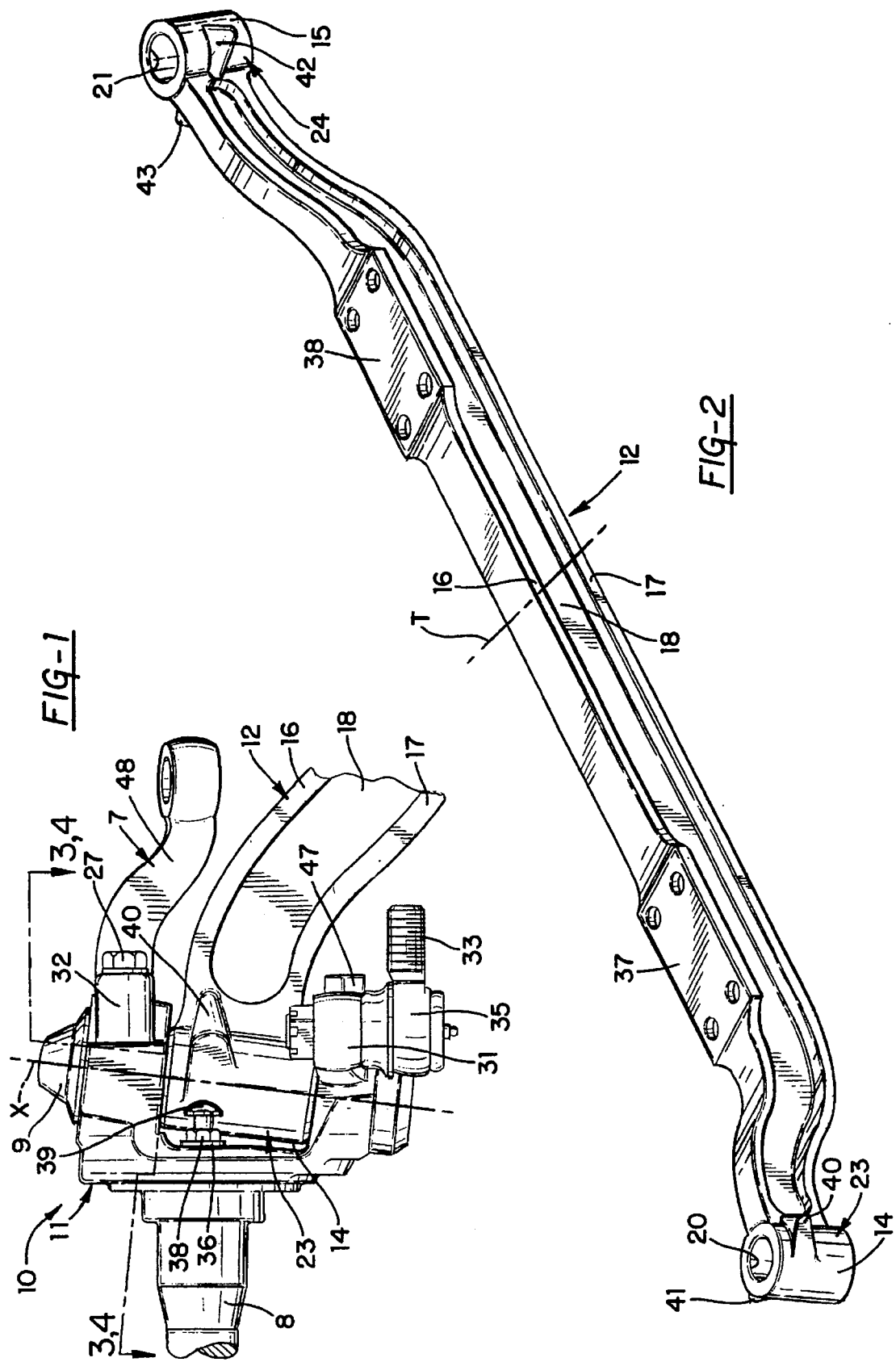

STEERING AXLE

BACKGROUND OF THE INVENTION

The present invention relates to axles and more specifically, to steering axles for motor vehicles that include a means of adjustably limiting the maximum steering angle.

Vehicles generally include a stop mechanism that limits the steer angle of the steerable wheels to prevent contact between the rotatable wheel and other structural elements. The stop mechanism generally comprises mating elements on the vehicle's axle and steering knuckle assembly that contact each other at a certain maximum steering angle and thereby limit further pivoting movement of the steering knuckle relative to the axle.

The greater the steering angle, the tighter the radius of turn that is achievable. Generally, to increase maneuverability, a greater steering angle is preferable. In many vehicles the stop mechanism is selectively set to limit steering angle to a predetermined maximum limit. Often however, individual vehicles of the same type will be provided with wheels and tires selected from a wide variety of heights and widths. An oversized wheel generally necessitates decreasing the maximum steering angle whereas a smaller wheel may permit increasing the steering angle. The use derived from a given vehicle may also influence the maximum desirable steer angle. Therefore, in various applications, it is preferable to provide a means of adjusting the stop mechanism and thereby varying the maximum possible steering angle of an individual vehicle.

With adjustable stop mechanisms, a means of moving and setting a stop member in a plurality of positions is provided to select a maximum steer angle. Accordingly, the maximum possible steer angle is variable as a result. The adjustable stop mechanism provides an adjustment range for a given vehicle wherein a plurality of factors influence the scope of the range. Generally, an excessive amount of adjustment cannot be provided. Therefore, a given vehicle type will have a range of maximum steer angles within which the angle can be adjustably set according to the actual conditions within which the vehicle operates in the field.

SUMMARY OF THE INVENTION

It has been found that a steering axle is capable of being used in two distinct types of vehicles, in particular, two distinct weight classes of trucks or, in the same type of vehicle employed for two distinct uses. This is made possible by providing two distinct ranges of maximum steer angles with the same axle. Therefore, according to an aspect of the present invention a steering axle is provided that is assembleable in a vehicle to provide a range of maximum steer angles and furthermore the same axle is assembleable in the same or a different vehicle to provide a different range of maximum steer angles. This provides the apparent advantages which accompany producing one distinct axle design instead of two.

According to this aspect of the invention, a reversible axle beam is provided which is assembleable to a pair of pivotable steering knuckle assemblies in one orientation providing a first range of maximum steering angles and in a second, reversed orientation providing a second range of maximum steering angles. The axle beam includes a symmetrical construction about its transverse centerline. However, the front half of the axle beam is not symmetrical with the rear half of the axle beam about the longitudinal centerline. This is because a pair of stops is provided at each end of the axle beam, each pair including two individual stops located at different positions along the length of the axle beam.

More specifically, the axle beam includes an elongated structure with two ends, each adapted to carry a steering knuckle assembly pivotably rotatable about a steering axis by a steering arm. Rotation is transferred from one knuckle assembly to the other by a tie rod assembly. Each end of the axle beam includes a pair of stops formed integrally therewith. The two stops within each pair are disposed on opposite sides of the longitudinal centerline from each other and at two distinct distances along the axle beam. This enables assembling the axle beam in either of two distinct models of vehicles with two differing ranges of maximum steering angle by simply selecting the front-to-rear orientation of the axle beam.

A cost advantage is achieved by means of providing a single unique axle beam design for two distinct applications.

BRIEF DESCRIPTION OF THE DRAWINGS

FIG. 1 is a fragmentary elevation view of a steering axle assembly.

FIG. 2 is a perspective view of an axle beam.

DETAILED DESCRIPTION OF THE PRESENTLY PREFERRED EMBODIMENT

Figure 3:
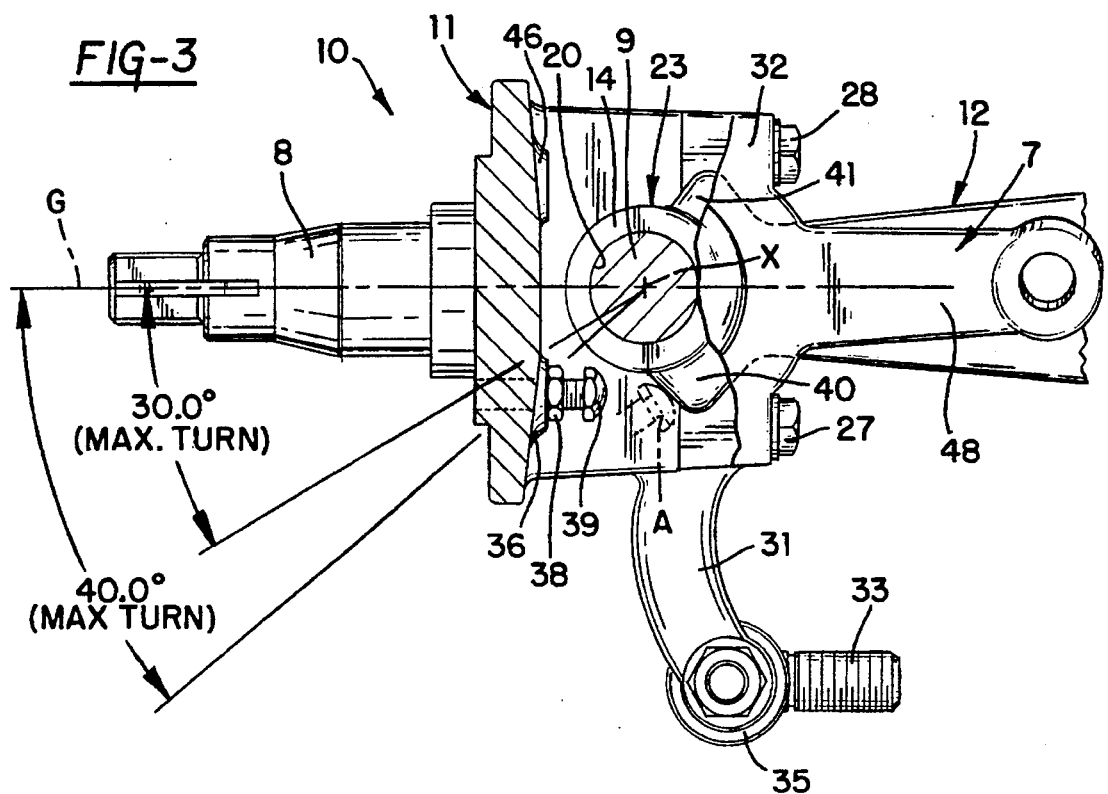
FIG. 3 is a fragmentary cross sectional view of a steering axle assembly taken generally, as indicated by the line 3—3 in FIG. 1.

Referring to the drawings, illustrated in FIG. 1 is the left side of a steering axle assembly 10 with the opposite, right side (not illustrated), being generally, symmetrical therewith. The axle assembly 10 includes an axle beam 12, which is more fully illustrated in FIG. 2. Pivotably connected to the axle beam 12 by a kingpin 9 (illustrated in FIG. 3), is left steering knuckle 11. Steering knuckle 11 includes an integral spindle 8 for rotatably mounting a vehicle hub and wheel (not illustrated). The left steering knuckle 11 is articulated by steering arm 7 to pivot, relative to axle beam 12, about steering axis X. Steering arm 7 is connected to left steering knuckle 11 by bolts 27 and 28 (illustrated in FIG. 3).

The steering arm 7 includes a yoke element 32 that engages left steering knuckle 11 and partially surrounds kingpin 9. A torque arm 48 is integrally formed with the yoke element 32 and serves as the input element for pivoting the steering knuckle 11. Steering articulation is conveyed to the end 15 of axle beam 12 by a tie rod (not illustrated) for pivoting a right steering knuckle (not illustrated), in coordination with steering knuckle 11. For this purpose, tie rod end 33 is connected to left steering knuckle 11 by a tie rod arm 31 and a ball joint 35. The tie rod arm 31 is bolted to the left steering knuckle 11 by bolt 47. The left steering knuckle 11 is also adapted for assembly to an end 15 of axle beam 12 rather than end 14. At the right end 15 a steering arm is generally, not used. Therefore, a yoke (not illustrated), without a torque arm is utilized.

Referring to FIG. 2, the axle beam 12 is illustrated. Axle beam 12 comprises a single piece and is formed by forging, heat treating and machining a steel bar. Axle beam 12 is generally, of an I-beam construction with upper and lower flanges 16 and 17 interconnected by web 18. Mounting plates 37 and 38 are integrally formed with the axle beam 12 on the upper flange 16. Each mounting plate 37 and 38 includes a plurality of mounting openings for connecting the axle to the associating vehicle (not illustrated). The mounting plates 37 and 38 are symmetrically disposed about the lateral center line T of the axle beam 12.

The axle beam 12 includes ends 14 and 15 which integrally form generally cylindrical shaped steering centers 23 and 24. The steering centers 23 and 24 define king pin bores 20 and 21, respectively. The kingpin bores carry a kingpin 9 (illustrated in FIG. 3), with kingpin bushings or bearings (not illustrated), as are conventionally known in the art.

Projecting stops 40 and 41 are formed about steering center 23 on opposing sides thereof. Likewise, projecting stops 42 and 43 are formed about steering center 24. In a first assembled orientation of the axle beam 12, stop 40 serves to limit the maximum left-hand turn angle of the axle 10 and stop 42 serves to limit the maximum right-hand turn angle of the axle 10. In a reversed, second assembled orientation of the axle beam 12, stop 43 serves to limit the maximum left-hand turn angle of the axle 10 and stop 41 serves to limit the maximum right-hand turn angle of the axle 10.

As shown in FIG. 1, the stop 40 is engageable by an adjustable stop pin 39. The stop bolt is threadedly received within an opening in the left steering knuckle 11 and therefore, pivots therewith. A lock nut 38 is carried on the stop bolt 39 and is biased against boss 36 of left steering knuckle 11 to lock the stop pin 39 at a selected degree of extension to limit pivoting movement of the left steering knuckle 11. The stop 40 is positioned on the rear of axle beam 12 as assembled in FIG. 1. Similarly, the stop 42 is positioned to limit rotation of a right steering knuckle at end 15. The left steering knuckle 11 includes a second boss 46 (shown in FIG. 3), which is not used in the present configuration.

Referring to FIG. 3, the stop 40 is located on the opposite side of the longitudinal centerline G, of axle assembly 10, relative to the stop 41. The stop 40 is visibly disposed further outward toward the end 14 than is the stop 41. Stop 40, in combination with the stop bolt 39, provides an assembly that is adjustable to limit the steering angle to a maximum turn angle within the range of thirty to forty degrees when the stop pin 39, as shown in phantom at A, contacts the stop 40 during counterclockwise rotation of the left steering knuckle 11 in left-hand turning. Clockwise rotation of the left steering knuckle 11 during right-hand turning, is limited through its interrelationship with a right steering knuckle (not illustrated), that contacts stop 42.

Figure 4:
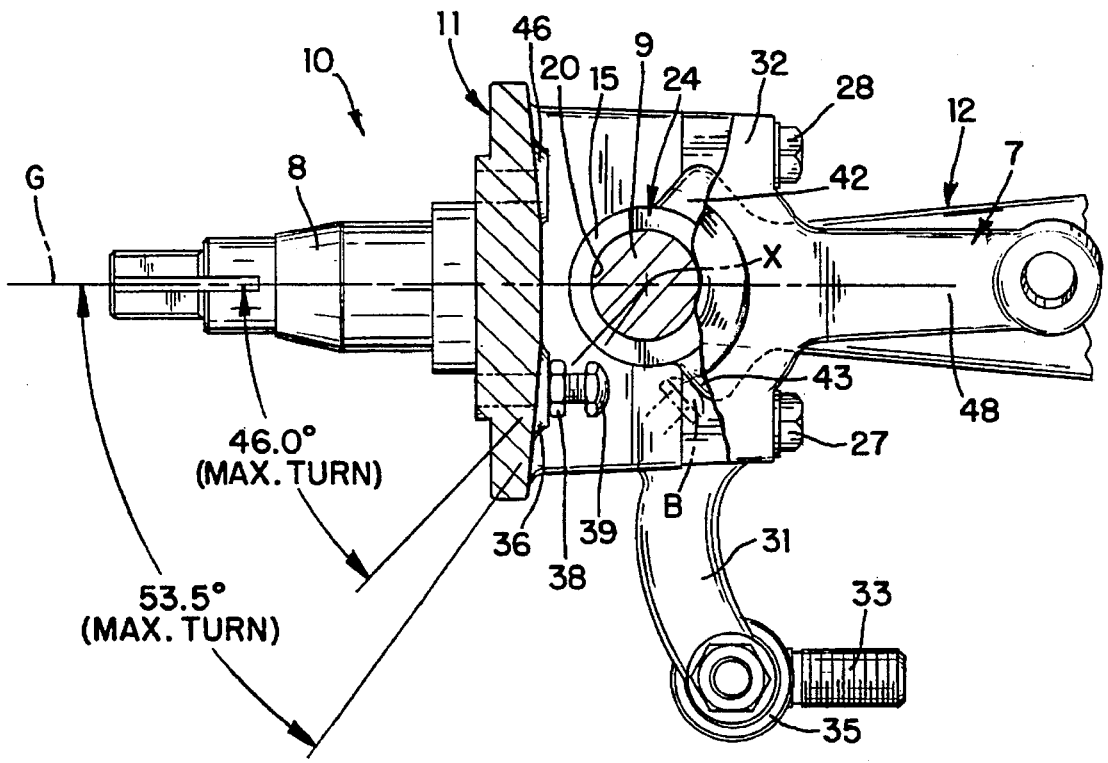
FIG. 4 is a fragmentary cross sectional view of a steering axle assembly taken generally, as indicated by the line 4—4 in FIG. 1.

Reversing the axle beam 12, as illustrated in FIG. 4, places stop 43 in combination with the left steering knuckle 11 to cooperate with stop bolt 39 in limiting the maximum possible left-hand turn angle. Likewise, stop 41 is placed in combination with the right steering knuckle (not illustrated), to limit the maximum possible right-hand turn angle. Stop 43, in combination with the stop bolt 39, provides an assembly that is adjustable to limit the steering angle to a maximum turn angle within the range of forty-six to fifty-three and one half degrees when the stop pin 39, as shown in phantom at B, contacts the stop 43.

By providing a symmetrical axle beam 12 with two pairs of stops, the front pair at a location distinct from that of the rear pair, the single axle beam 12 is utilized in two different applications operating with different ranges of maximum steering angles.

What is claimed is:

1. A steering axle comprising:

an axle beam having an elongated body and a longitudinal centerline with first and second ends, each end being capable of carrying a steering knuckle assembly that is pivotably rotatable, wherein each end of the axle beam includes a pair of stops formed integrally therewith, the two stops within each pair of stops being disposed on opposite sides of the longitudinal centerline and at first and second distances along the axle beam relative to the end wherein the axle beam is reversibly assembleable with the first and second ends interchangeable to alternatively provide two different ranges of maximum steering angles.

2. A steering axle comprising:

a reversible axle beam having a longitudinal body with a first end and a second end each end defining a cylindrical steering center and including a first and a second stop projecting from opposing sides of the steering center wherein the first and the second stops are disposed at different relative positions along the length of the longitudinal body; and a steering knuckle pivotably mounted on each of the first and the second ends about the steering centers including an adjustable stop pin that is engageable with the respective first stop.

3. A steering axle according to claim 2 wherein the axle beam is reversible such that the axle beam is assembleable wherein the adjustable stop pins operate to limit the maximum steering angle of the axle in both the left and the right turn directions by alternatively contacting the second stop of the first and the second ends of the axle beam.

4. A steering axle steerable in left and right turn directions comprising:

an axle beam having an elongated body with first and second ends, each end defining a steering center with a pair of stops formed about each steering center each pair of stops including a first stop positioned a first distance along the elongated body and a second stop positioned a second distance along the elongated body;

a kingpin carried in each steering center;

a steering knuckle pivotably mounted on each kingpin, each having an adjustable stop pin operating to limit the maximum steering angle of the axle in both the left and right turn directions by alternatively contacting the first stop of the first and the second ends of the axle beam.

* * * * *